United States Patent
Suzuki

(10) Patent No.: US 9,323,430 B2
(45) Date of Patent: Apr. 26, 2016

(54) IMAGE PROCESSING DEVICE AND NON-TRANSITORY COMPUTER-READABLE MEDIUM STORING IMAGE PROCESSING PROGRAM

(71) Applicant: Yuichiro Suzuki, Komaki (JP)

(72) Inventor: Yuichiro Suzuki, Komaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 357 days.

(21) Appl. No.: 14/097,297

(22) Filed: Dec. 5, 2013

(65) Prior Publication Data

US 2014/0096064 A1   Apr. 3, 2014

Related U.S. Application Data

(63) Continuation-in-part of application No. PCT/JP2012/058133, filed on Mar. 28, 2012.

(30) Foreign Application Priority Data

Jun. 8, 2011   (JP) .................. 2011-128498

(51) Int. Cl.
*G06F 3/0488* (2013.01)
*G06F 3/0484* (2013.01)
*G06F 3/12* (2006.01)

(52) U.S. Cl.
CPC ............ *G06F 3/0484* (2013.01); *G06F 3/0488* (2013.01); *G06F 3/1208* (2013.01); *G06F 3/1256* (2013.01); *G06F 3/1292* (2013.01)

(58) Field of Classification Search
CPC .............................. G06F 3/0484; G06F 3/0488
See application file for complete search history.

(56) References Cited

U.S. PATENT DOCUMENTS

| 6,115,024 A | 9/2000 | Hayama |
| 2004/0207859 A1 | 10/2004 | Kadol et al. |
| 2007/0201096 A1 | 8/2007 | Motominami |
| 2009/0164894 A1* | 6/2009 | Takekawa ........... G06F 3/04845 715/274 |
| 2010/0002251 A1* | 1/2010 | Tachibana ............. G06F 3/0488 358/1.15 |
| 2011/0199629 A1* | 8/2011 | Sensu ................ H04N 1/00411 358/1.13 |

FOREIGN PATENT DOCUMENTS

| JP | 01194062 | 8/1989 |
| JP | 10297062 | 11/1998 |
| JP | 2004318581 | 11/2004 |

(Continued)

OTHER PUBLICATIONS

Office Action in Japanese Application No. 2011-128498 mailed Feb. 10, 2015.

(Continued)

*Primary Examiner* — Anil Bhargava
(74) *Attorney, Agent, or Firm* — McCarter & English, LLP

(57) ABSTRACT

An image processing device includes a touch panel, a screen group storage portion, a processor, and a memory. The memory stores computer-readable instructions that, when executed by the processor, cause the image processing device to perform operations. The operations include determining that it is a switching timing when a predetermined condition is satisfied, and switching a currently displayed screen to a next screen and displaying the next screen on the touch panel, based on screen group information stored in the screen group storage portion, in response to determining that it is the switching timing.

12 Claims, 14 Drawing Sheets

(56) References Cited

FOREIGN PATENT DOCUMENTS

| | | |
|---|---|---|
| JP | 2005271541 | 10/2005 |
| JP | 2007228010 | 9/2007 |
| JP | 2008033769 | 2/2008 |

OTHER PUBLICATIONS

International Search Report issue in PCT/JP2012/058133.
International Preliminary Report on Patentability issued in Application No. PCT/JP2012/058133 on Dec. 10, 2013.

* cited by examiner

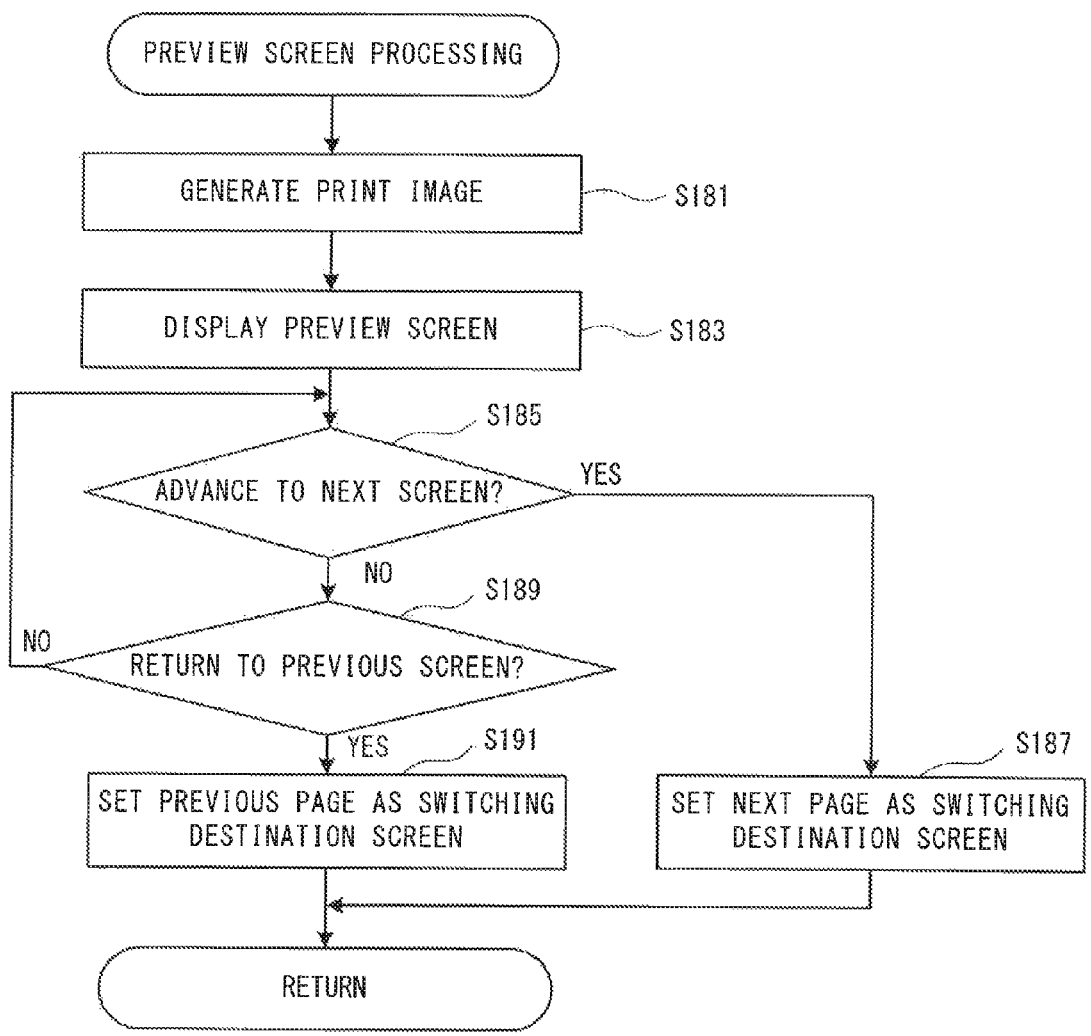

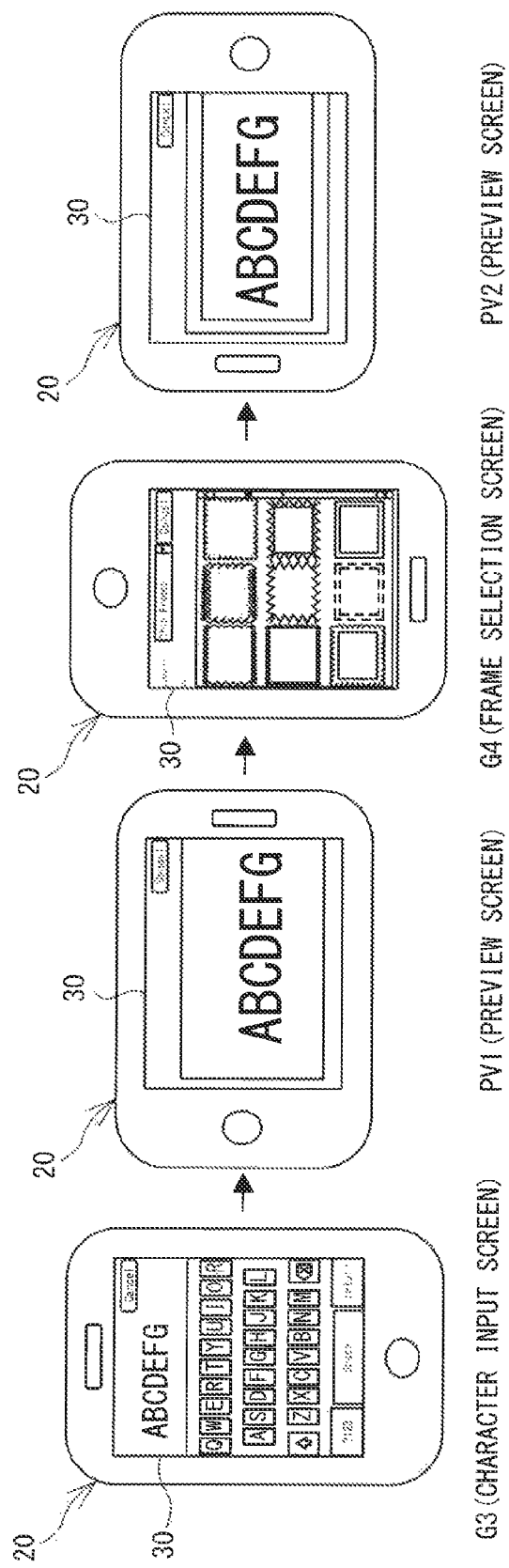

IMAGE PROCESSING DEVICE AND NON-TRANSITORY COMPUTER-READABLE MEDIUM STORING IMAGE PROCESSING PROGRAM

CROSS-REFERENCE TO RELATED APPLICATION

This application is a continuation-in-part of International Application No. PCT/JP2012/058133, filed Mar. 28, 2012, which claims priority to Japanese Patent Application No. 2011-128498, filed on Jun. 8, 2011. The disclosure of the foregoing application is hereby incorporated by reference in its entirety.

BACKGROUND

The present disclosure relates to an image processing device that is provided with a user interface function that prompts a user to interactively perform an input operation, and a non-transitory computer-readable medium storing an image processing program.

In related art, an image processing device is known that is provided with a user interface function that prompts a user to interactively perform an input operation. As this type of image processing device, a printer is known that performs image editing in response to an input operation by a user. In some cases, this type of printer is provided with a so-called preview display function that displays an image that has been edited by the user before printing is performed. In the printer, for example, an original image and print setting information are displayed on a display device. After the display of the original image, if a predetermined number of operations on an operation portion are detected, a print image for display that is the original image on which image adjustment processing has been performed is displayed on the display device based on the print setting information.

SUMMARY

In the above-described printer, when it is wished to view a preview display of the image after editing, or when it is wished to once more display the image before editing, it is necessary for the user to perform a predetermined screen switching operation each time. After that, when the user performs further editing of the image, it is necessary for the user to cause a screen to be displayed in accordance with an editing target, by performing a predetermined screen switching operation.

Various embodiments of the broad principles derived herein provide an image processing device that can suppress an operating load from a start of editing an image until performing printing and also allow an image to be verified as appropriate during editing, and a non-transitory computer-readable medium storing an image processing program.

The embodiments herein provide an image processing device that includes a touch panel, a screen group storage portion, a processor, and a memory. The touch panel is configured to switch and display screens that include interactive screens and configured to detect an operation on at least one of the interactive screens currently being displayed. Each of the interactive screens is a screen on which a user interactively performs an input operation. The screen group storage portion is configured to store screen group information that defines the screens to be displayed sequentially on the touch panel and defines a display order of the screens. The screens that are defined by the screen group information includes a plurality of setting screens and at least one preview screen. Each of the plurality of setting screens is one of the interactive screens that prompts the user to set at least one of a character and a decorative mode. Each of the at least one preview screen is one of the interactive screens that shows a print image based on at least one of the character and the decorative mode set on the at least one of the plurality of setting screens. The memory stores computer-readable instructions that, when executed by the processor, cause the image processing device to perform operations. The operations include determining that it is a switching timing when a predetermined condition is satisfied. The switching timing is a timing at which a currently displayed screen is switched to a next screen and the next screen is displayed. The currently displayed screen is one of the screens that is being displayed on the touch panel. The next screen is one of the screens that is different to the currently displayed screen. The operations further include switching the currently displayed screen to the next screen and displaying the next screen on the touch panel, based on the screen group information stored in the screen group storage portion, in response to determining that it is the switching timing. When the currently displayed screen is switched to the next screen that is one of the plurality of setting screens and the next screen is displayed on the touch panel, a key image that is used to input information on the next screen is displayed along with the next screen. And when the currently displayed screen that is one of the plurality of setting screens is switched to the next screen and the next screen is displayed on the touch panel, one of the at least one preview screen is displayed on the touch panel as the next screen at least once until all of the plurality of setting screens are sequentially switched and displayed on the touch panel.

The embodiments described herein also provide a non-transitory computer readable medium storing an image processing program. The image processing program includes computer readable instructions to be executed by a processor of an image processing device. The image processing device includes a touch panel and a screen group storage portion. The computer readable instructions cause the processor to perform the steps of determining that it is a switching timing when a predetermined condition is satisfied, and switching and displaying the screens on the touch panel, based on screen group information stored in the screen group storage portion, in response to determining that it is the switching timing. The switching timing is a timing at which a currently displayed screen is switched to a next screen and the next screen is displayed. The currently displayed screen is one of screens that is being displayed on the touch panel. The next screen is one of the screens that is different to the currently displayed screen. The screens include interactive screens. The touch panel is configured to switch and display the screens and to detect an operation on at least one of the interactive screens currently being displayed. Each of the interactive screens is a screen on which a user interactively performs an input operation. The screen group storage portion is configured to store screen group information. The screen group information defines the screens to be displayed sequentially on the touch panel and a display order of the screens. The screens that are defined by the screen group information include a plurality of setting screens and at least one preview screen. Each of the plurality of setting screens is one of the interactive screens that prompts the user to set at least one of a character and a decorative mode. Each of the at least one preview screen is one of the interactive screens that shows a print image based on at least one of the character and the decorative mode set on the at least one of the plurality of setting screens. When the currently displayed screen is switched to the next screen that is one of the plurality of setting screens and the next screen is displayed on the touch panel, a key image that is used to input information on the next screen is displayed along with the next screen. And when the currently displayed screen that is one of the plurality of setting screens is switched to the next screen and the next screen is displayed on the touch panel, one of the at least one preview screen is displayed on the touch panel as the next screen at least once until all of the plurality of setting screens are sequentially switched and displayed on the touch panel.

BRIEF DESCRIPTION OF THE DRAWINGS

Embodiments of the present disclosure will be described below in detail with reference to the accompanying drawings in which:

FIG. 13 is a flowchart of preview screen processing; and

FIG. 14 is an example of a group of screens that are provided by a print application according to a modified example.

DETAILED DESCRIPTION

Figure 1:
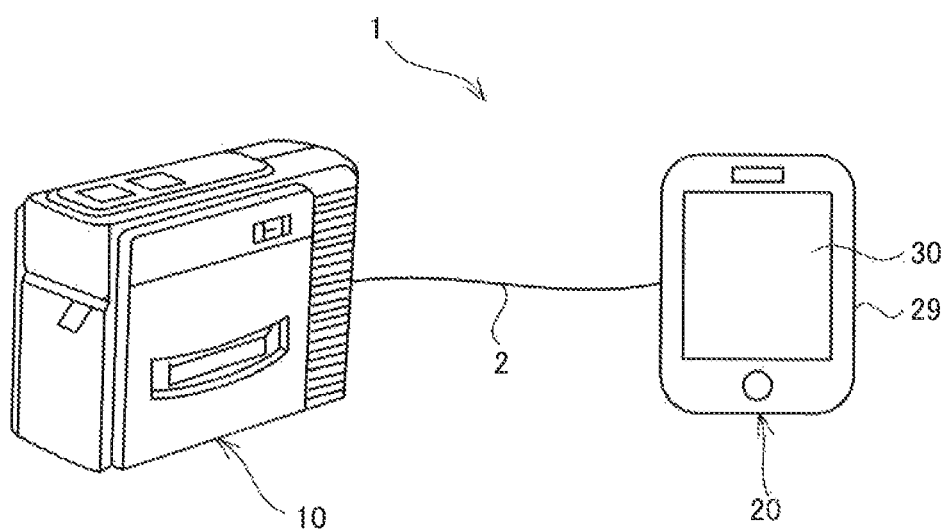
FIG. 1 is a schematic configuration diagram of a printing system.

An embodiment of the present disclosure will be explained with reference to the drawings. These drawings are used to explain technological features that can be adopted by the present disclosure. Configurations of devices noted in the drawings, and flowcharts of various processing etc. are not limited only to the examples given and are simply explanatory examples.

An overview of a printing system 1 will be explained with reference to FIG. 1. The printing system 1 includes a printer 10 and a mobile terminal 20 that are connected by a wired or a wireless connection. In the present embodiment, the printer 10 and the mobile terminal 20 are connected by a cable 2. The printer 10 is a label printer that is used to print characters (letters, symbols, graphics and the like) on a tape that is a long print medium. The mobile terminal 20 is a compact computer terminal (such as a smart phone) that is used by a user to set characters of a print target and a decorative mode for the characters.

In the mobile terminal 20, when the user sets the characters and the decorative mode, print target data that shows the content of the settings is generated. The print target data that is generated in the mobile terminal 20 is transmitted to the printer 10 via the cable 2. In the printer 10, processing to print on the tape (print processing) is performed based on the print target data received from the mobile terminal 20. The user can thus perform printing on the tape using the printer 10, by operating the mobile terminal 20.

Figure 2:
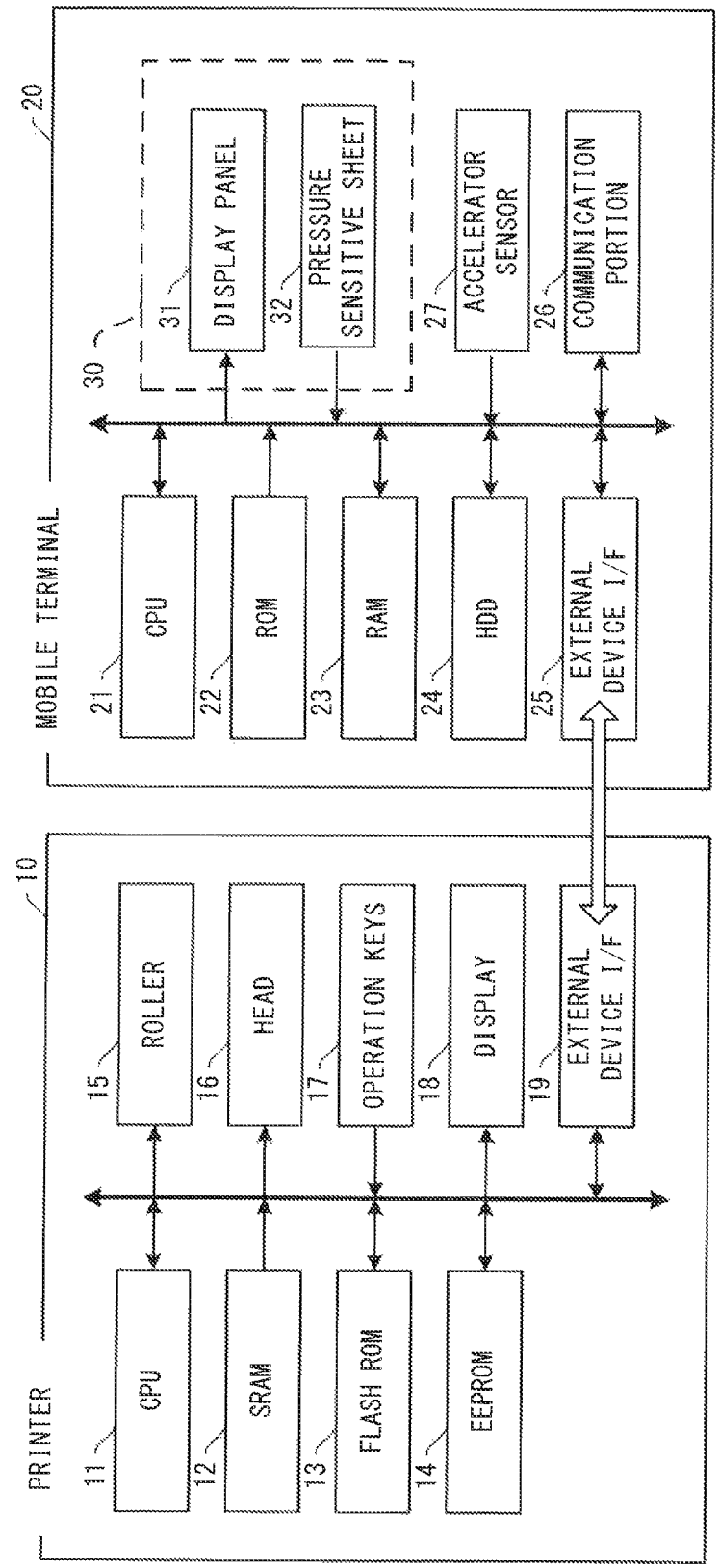
FIG. 2 is a block diagram showing an electrical configuration of the printing system.

An electrical configuration of the printing system 1 will be explained with reference to FIG. 2. The printer 10 is provided with a CPU 11 that performs overall control of the printer 10. The CPU 11 is electrically connected to an SRAM 12, a FLASH ROM 13, an EEPROM 14, a roller 15, a head 16, operation keys 17, a display 18 and an external device interface (an external device I/F) 19.

A timer, a counter and temporary data are stored in the SRAM 12. A control program of the CPU 11, a BIOS and an OS etc. are stored in the FLASH ROM 13. Parameters and initial setting information are stored in the EEPROM 14. The roller 15 feeds a tape that is housed in a tape cassette (not shown in the drawings) which is mounted in the printer 10. The head 16 performs printing on the tape that is fed by the roller 15. The external device I/F 19 is a controller that is used to perform communication with the mobile terminal 20 via the cable 2.

The mobile terminal 20 is provided with a CPU 21 that performs overall control of the mobile terminal 20. The CPU 21 is electrically connected to a ROM 22, a RAM 23, an HDD 24, an external device I/F 25, a communication portion 26, an acceleration sensor 27 and a touch panel 30. A boot program and a BIOS etc. are stored in the ROM 22. A timer, a counter and temporary data are stored in the RAM 23. Various application programs and an OS are stored in the HDD 24. A print application and screen group information are also stored in the HDD 24. The print application is one of the application programs and is used to perform print target setting processing (refer to FIG. 6) that will be explained later. The screen group information is used by the print application that will be explained later. Note that the mobile terminal 20 may install, in the HDD 24, a print application that is stored in a computer-readable medium, such as a CD-ROM, for example.

The external device I/F 25 is a controller that is used to perform communication with the printer 10 via the cable 2. The communication portion 26 is a controller that is used to perform communication with another electronic device via a public network that is not shown in the drawings. The acceleration sensor 27 identifies a rotation angle (specifically, an inclination of the mobile terminal 20) from a constant state of the mobile terminal 20 by detecting an acceleration of the mobile terminal 20.

The mobile terminal 20 is provided with a main body 29 (refer to FIG. 1) that is rectangular in a front view. The touch panel 30 is provided on the front face of the main body 29. The touch panel 30 is a display body that can detect contact with an external object. The touch panel 30 has a rectangular display area corresponding to the shape of the main body 29. The touch panel 30 is formed by laminating a substantially transparent pressure sensitive sheet 32, which detects the contact of the external object, on a display panel 31 that displays an image. Based on a contact position of the external object identified using the pressure sensitive sheet 32, the CPU 21 can distinguish an input operation by the user.

An example of an operation mode and screen transitions of the mobile terminal 20 will be explained with reference to FIG. 3 to FIG. 5. The mobile terminal 20 is provided with a user interface function that interactively prompts a user to perform an input operation. When the print application is activated by the user, an initial screen G1 is displayed on the touch panel 30. The initial screen G1 is a screen that prompts the user to select whether to newly generate the print target data or to update the print target data.

When the update of the print target data (an "Open file" icon that will be explained later) is selected on the initial screen G1, a file selection screen G2 is displayed on the touch panel 30. The file selection screen G2 is a screen that prompts the user to make a selection from the existing print target data. When new generation of the print target data (a "New File" icon that will be explained later) is selected on the initial screen G1, or when the print target data is selected on the file selection screen G2, a plurality of screens are switched and displayed on the touch panel 30, based on the screen group information stored in the HDD 24. At this time, the plurality of screens that include interactive screens on which the user interactively performs input operations are switched and displayed on the touch panel 30.

The screen group information defines the screens (hereinafter also referred to as display target screens) to be displayed on the touch panel 30, and also defines a display order of the display target screens. The display target screens include at least one setting screen and at least one preview screen. Each of the at least one setting screen is one of the interactive screens that prompts the user to set characters and the decorative mode for the characters. Each of the at least one preview screen is one of the interactive screens that shows a print image based on the content set using the at least one setting screen. The screen group information of the present embodiment indicates the display order showing which one of each of the preview screens is displayed after each of the setting screens.

The setting screens of the present embodiment include a character input screen G3, a frame selection screen G4, an image selection screen G5 and a label length setting screen G6. The character input screen G3 is a screen that prompts the user to set characters of the print target. The frame selection screen G4, the image selection screen G5 and the label length setting screen G6 are screens that prompt the user to set the decorative mode of the characters. Specifically, a "decorative frame" that adds decoration around the characters can be set on the frame selection screen G4. A "decorative image" that is inserted into the characters can be set on the image selection screen G5. A "label length" of the tape on which the characters are printed can be set on the label length setting screen G6.

Preview screens PV1 to PV4, which show a state in which the print image is printed on a long medium (the tape), are provided in accordance with the character input screen G3, the frame selection screen G4, the image selection screen G5 and the label length setting screen G6, respectively. More specifically, the preview screen PV1 displays the print image based on the characters set on the character input screen G3. The preview screen PV2 displays the print image based on the decorative frame set on the frame selection screen G4. The preview screen PV3 displays the print image based on the decorative image set on the image selection screen G5. The preview screen PV4 displays the print image based on the label length set on the label length setting screen G6.

Each of the preview screens PV1 to PV4 of the present embodiment shows the print image that reflects all of the content set before the display of each of the preview screens. Specifically, the preview screen PV4 illustrated in FIG. 5 displays the print image that is represented by the characters set on the character input screen G3, the decorative frame set on the frame selection screen G4, the decorative image set on the image selection screen G5 and the label length set on the label length setting screen G6.

After all of the display target screens indicated by the screen group information have been displayed, a final screen G7 is displayed on the touch panel 30. The final screen G7 is a screen that prompts the user to select whether to print or save the print target data.

Note that the screen group information stored in the HDD 24 is changed depending on the display target screens specified by the user and on the display order of the display target screens specified by the user. In other words, the user can freely set the display target screens that are displayed when the print application is activated. And the user can freely set the display order of the display target screens that are displayed when the print application is activated. In an initial state when the screen group information has not been changed, default screen group information is stored in the HDD 24. In the default screen group information, the display target screens and the display order of the display target screens are defined as: "G3→PV1→G4→PV2→G5→PV3→G6→PV4." Thus, when the print application is activated in the state in which the default screen group information is stored in the HDD 24, a plurality of screens are sequentially switched and displayed as illustrated in FIG. 3 to FIG. 5.

Print target setting processing that is performed using the mobile terminal 20 will be explained with reference to FIG. 6 to FIG. 13. The print target setting processing (FIG. 6) is performed by the CPU 21 when the print application is activated on the mobile terminal 20.

Figure 6:
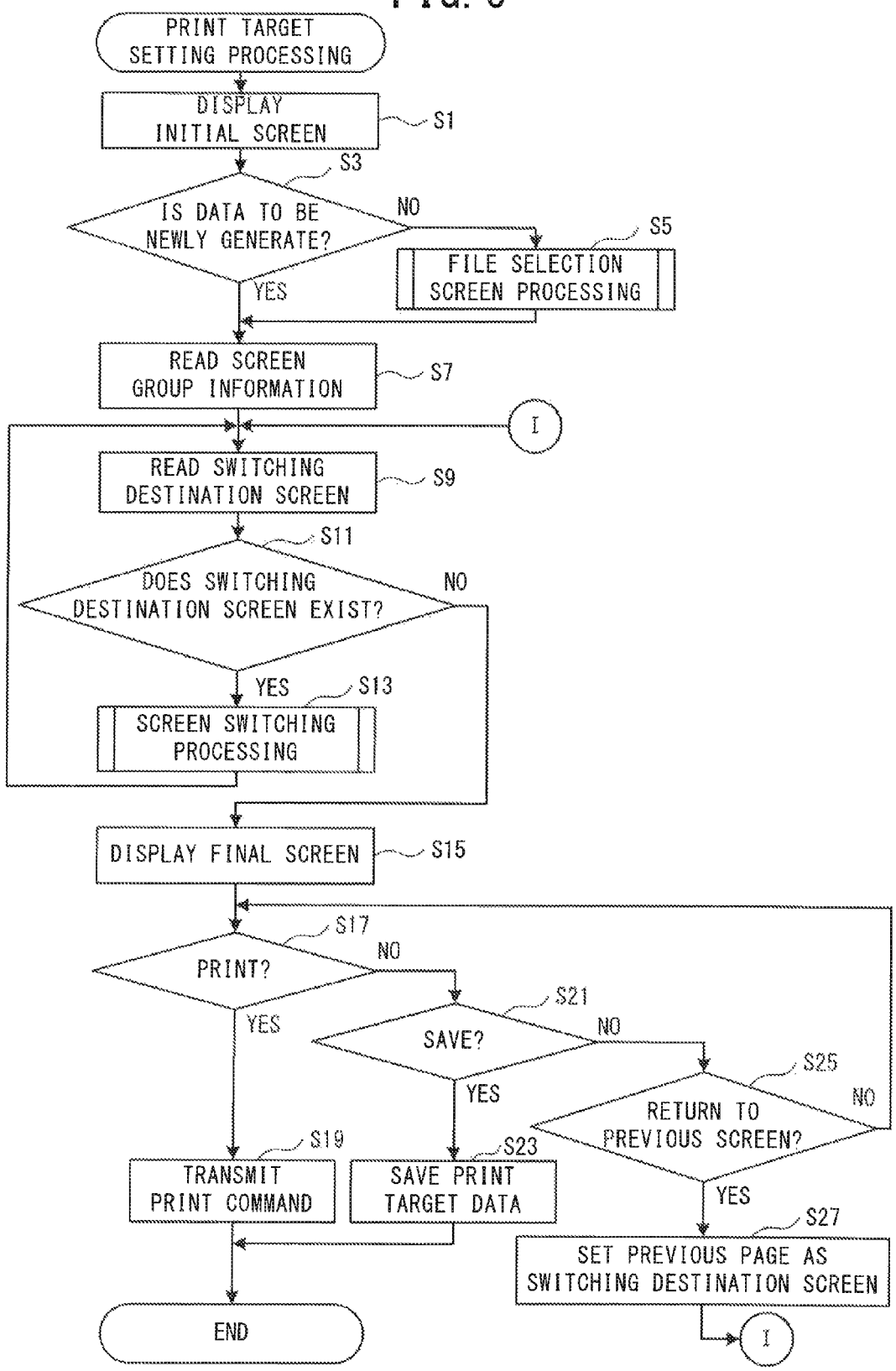
FIG. 6 is a flowchart of print target setting processing.

As shown in FIG. 6, in the print target setting processing, first the initial screen G1 is displayed on the touch panel 30 (step S1). The initial screen G1 includes a key image (the "New File" icon shown in FIG. 3) that is used to specify the new generation of the print target data, and a key image (the "Open File" icon shown in FIG. 3) that is used to specify the update of the existing print target data. When the "Open File" icon is selected on the initial screen G1, it is determined that the existing print target data will be updated (no at step S3), and file selection processing is performed as follows (step S5).

Figure 7:
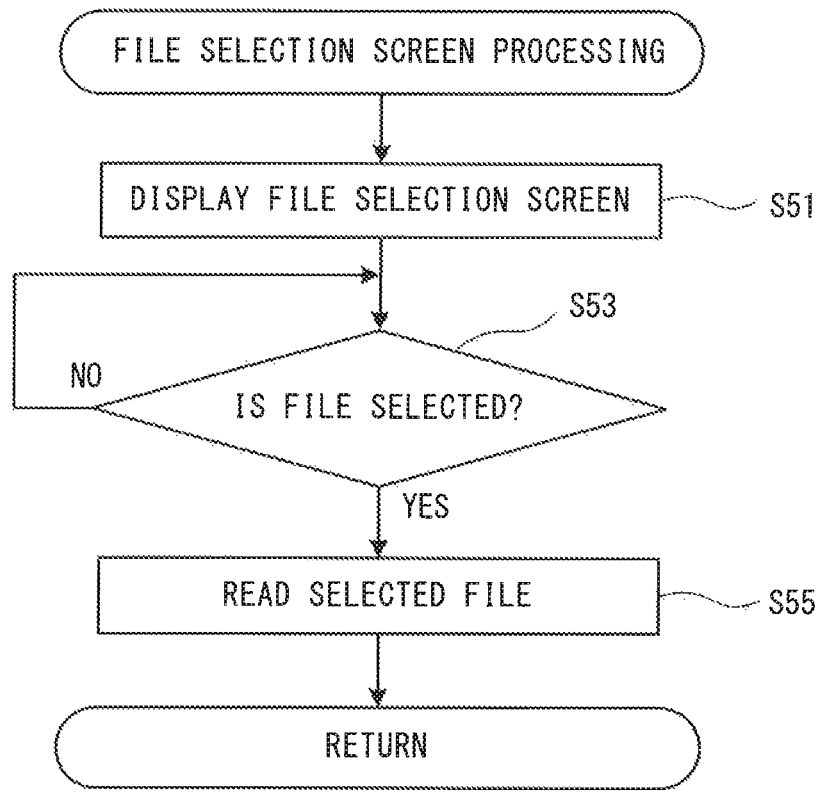
FIG. 7 is a flowchart of file selection screen processing.

As shown in FIG. 7, in the file selection processing, the display screen of the touch panel 30 switches from the initial screen G1 to the file selection screen G2 and displays the file selection screen G2 (step S51). The file selection screen G2 includes an input area that is used to specify the existing print target data. The user can freely specify one of the print target data that are displayed as a list in the input area. Note that the print target data that are displayed as a list in the input area can be switched by pressing a key image (a "Next Page . . . " icon shown in FIG. 3) that is included on the file selection screen G2. When the print target data is specified on the file selection screen G2 (yes at step S53), the specified print target data is read into the RAM 23 (step S55). After the processing at step S55 is performed, the processing returns to the print target setting processing (FIG. 6). Note that, when the print target data is not specified (no at step S53), the processing returns to step S53 and waits for the input operation by the user.

The explanation will return to FIG. 6. When the "New File" icon is selected on the initial screen G1, it is determined that the print target data will be newly generated (yes at step S3). In this case, the processing from step S7 onward is performed on new print target data that has been set in the RAM 23. On the other hand, after the processing at step S5 is performed, the processing from step S7 onward is performed on the existing print target data that has been read into the RAM 23. At step S7, the screen group information stored in the HDD 24 is read into the RAM 23. At this time, a first page indicated by the screen group information is set in the RAM 23 as a switching destination screen (a screen that is switched with the screen currently being displayed and that is then displayed).

After the processing at step S7 is performed, the switching destination screen is read out from the RAM 23 (step S9) and it is determined whether the switching destination screen exists (step S11). When the switching destination screen has been read out from the RAM 23, it is determined that the switching destination screen exists (yes at step S11) and the following screen switching processing is performed (step S13).

Figure 8:
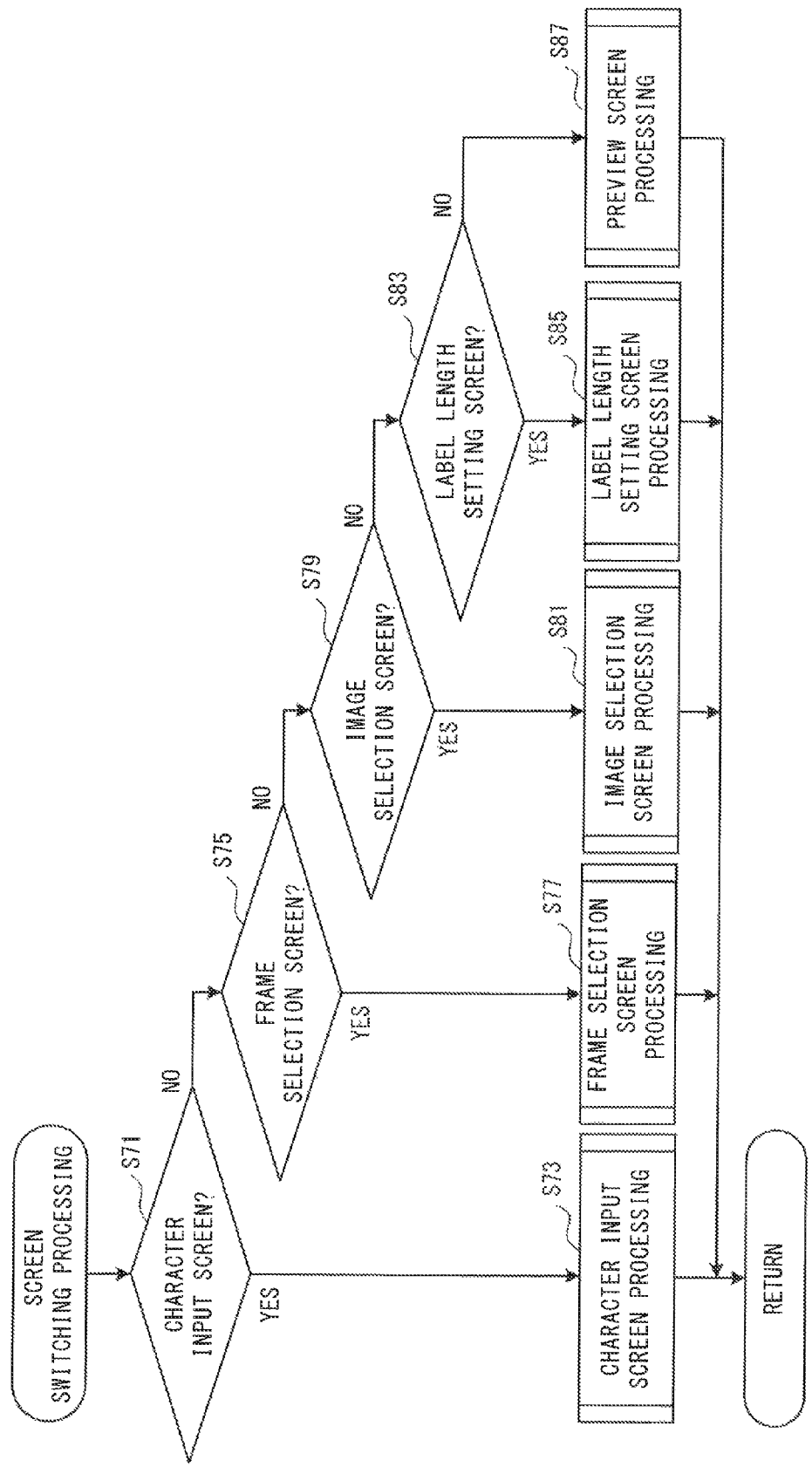
FIG. 8 is a flowchart of screen switching processing.

In the screen switching processing, first, as shown in FIG. 8, it is determined whether the switching destination screen read out at step S9 is the character input screen G3 (step S71). When the switching destination screen is the character input screen G3 (yes at step S71), character input screen processing that will be described later is performed (step S73). When the switching destination screen is not the character input screen G3 (no at step S71), it is determined whether the switching destination screen is the frame selection screen G4 (step S75). When the switching destination screen is the frame selection screen G4 (yes at step S75), frame selection screen processing that will be described later is performed (step S77). When the switching destination screen is not the frame selection screen G4 (no at step S75), it is determined whether the switching destination screen is the image selection screen G5 (step S79). When the switching destination screen is the image selection screen G5 (yes at step S79), image selection screen processing that will be described later is performed (step S81).

When the switching destination screen is not the image selection screen G5 (no at step S79), it is determined whether the switching destination screen is the label length setting screen G6 (step S83). When the switching destination screen is the label length setting screen G6 (yes at step S83), label length setting screen processing that will be described later is performed (step S85). When the switching destination screen is not the label length setting screen G6 (no at step S83), the switching destination screen is one of the preview screens PV1 to PV4, and thus preview screen processing that will be described later is performed (step S87). After the processing is performed at one of step S73, step S77, step S81, step S85 or step S87, the processing returns to the print target setting processing (FIG. 6).

Figure 9:
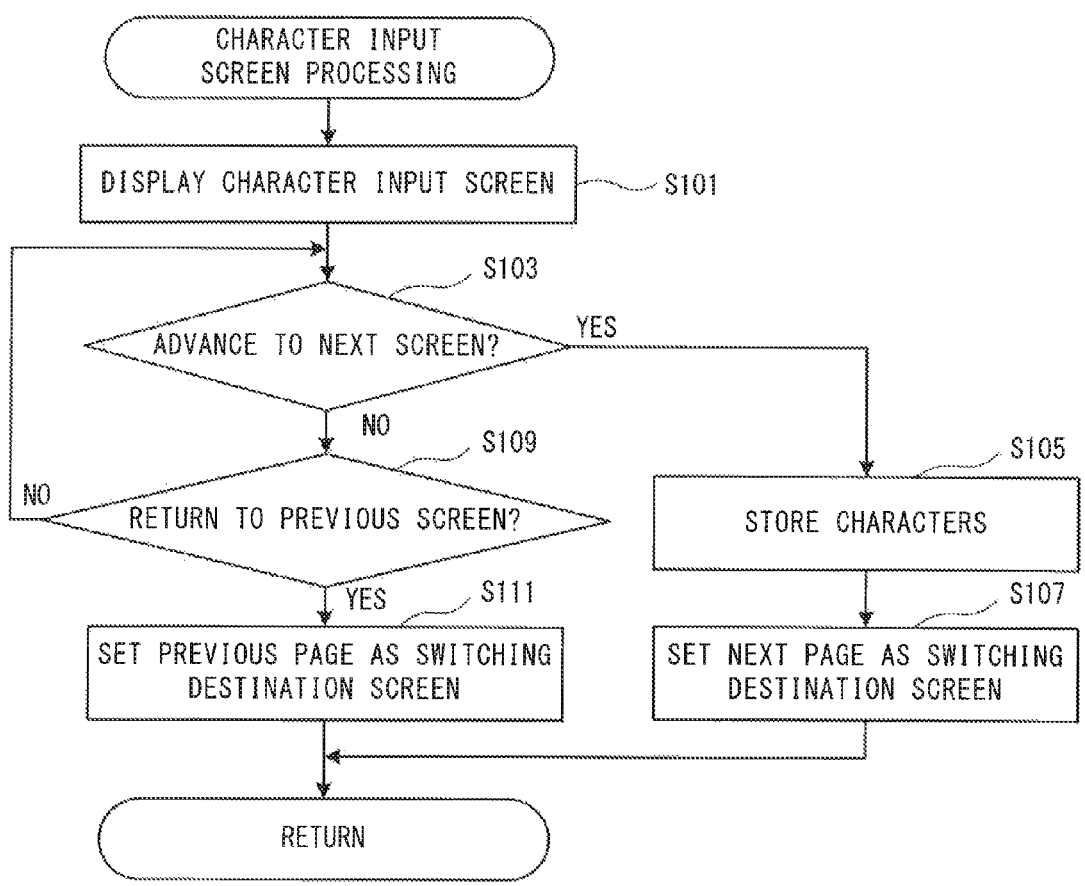
FIG. 9 is a flowchart of character input screen processing.

As shown in FIG. 9, in the character input screen processing, the display screen of the touch panel 30 is switched to the character input screen G3 and the character input screen G3 is displayed (step S101). The character input screen G3 includes key images indicating operation keys (images that simulate a keyboard shown in FIG. 3) that are used to input characters, and a display area for the input characters etc. If an operation that instructs advancing to a next screen is performed on the character input screen G3 (yes at step S103), the characters input on the character input screen G3 are stored in the RAM 23 (step S105). The operation that instructs advancing to a next screen is such as depressing a RETURN key that is displayed on the screen, or performing a page feed operation by sliding one's finger on the screen toward the left etc.

After that, based on the screen group information stored in the HDD 24, the screen that is one after the character input screen G3 in the display order (that is, the next page) is set in the RAM 23 as the switching destination screen (step S107). However, if the display order of the character input screen G3 indicated in the screen group information is the last page, the switching destination screen is updated to a not set status.

On the other hand, if an operation that instructs returning to a previous screen is performed on the character input screen G3 (no at step S103, yes at step S109), the screen that is one before the character input screen G3 in the display order (that is, the previous page) is set as the switching destination screen in the RAM 23 (step S111). The operation that instructs returning to a previous screen is such as depressing a "Cancel" icon that is displayed on the screen, or performing a page return operation by sliding one's finger on the screen toward the right etc. However, if the display order of the character input screen G3 indicated in the screen group information is the first page, the switching destination screen is updated to the character input screen G3.

When an operation to switch the page has not been performed (no at step S103, no at step S109), the processing returns to step S103 and waits for the input operation by the user. After the processing at step S107 or at step S111 is performed, the processing returns to the print target setting processing (FIG. 6). Note that, in the next screen switching processing (FIG. 8), the display screen of the touch panel 30 is switched from the display of the character input screen G3 to the display of the switching destination screen set at step S107 or at step S111. However, when the switching destination screen is updated to the not set status at step S107, the display screen of the touch panel 30 is switched to the final screen G7 (that will be described later) and the final screen G7 is displayed (no at step S11; step S15).

Figure 10:
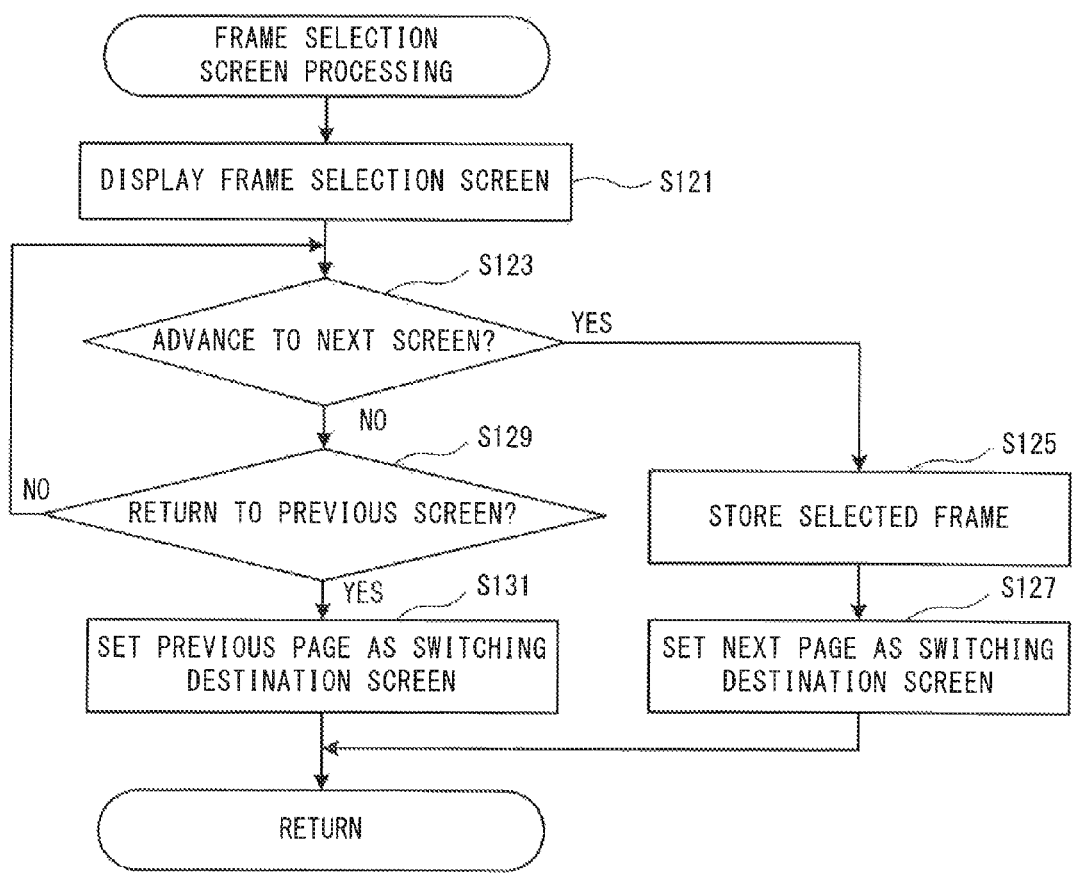
FIG. 10 is a flowchart of frame selection screen processing.

As shown in FIG. 10, in the frame selection screen processing, the display screen of the touch panel 30 is switched to the frame selection screen G4 and the frame selection screen G4 is displayed (step S121). The frame selection screen G4 includes a plurality of decorative frames that are displayed in a list format, and also includes an operation area that allows the user to freely select one of the decorative frames (refer to FIG. 4). If the operation that instructs advancing to a next screen is performed on the frame selection screen G4 (yes at step S123), the decorative frame selected on the frame selection screen G4 (a selected frame) is stored in the RAM 23 (step S125).

After that, based on the screen group information stored in the HDD 24, the next page after the frame selection screen G4 is set in the RAM 23 as the switching destination screen (step S127). However, if the display order of the frame selection screen G4 indicated in the screen group information is the last page, the switching destination screen is updated to the not set status. On the other hand, if the operation that instructs returning to a previous screen is performed on the frame selection screen G4 (no at step S123, yes at step S129), the previous page to the frame selection screen G4 is set as the switching destination screen in the RAM 23 (step S131). However, if the display order of the frame selection screen G4 indicated in the screen group information is the first page, the switching destination screen is updated to the frame selection screen G4.

When an operation to switch the page has not been performed (no at step S123, no at step S129), the processing returns to step S123 and waits for the input operation by the user. After the processing at step S127 or at step S131 is performed, the processing returns to the print target setting processing (FIG. 6). Note that, in the next screen switching processing (FIG. 8), the display screen of the touch panel 30 is switched from the display of the frame selection screen G4 to the display of the switching destination screen set at step S127 or at step S131. However, when the switching destination screen is updated to the not set status at step S127, the display screen of the touch panel 30 is switched to the final screen G7 (that will be described later) and the final screen G7 is displayed (no at step S11; step S15).

Figure 11:
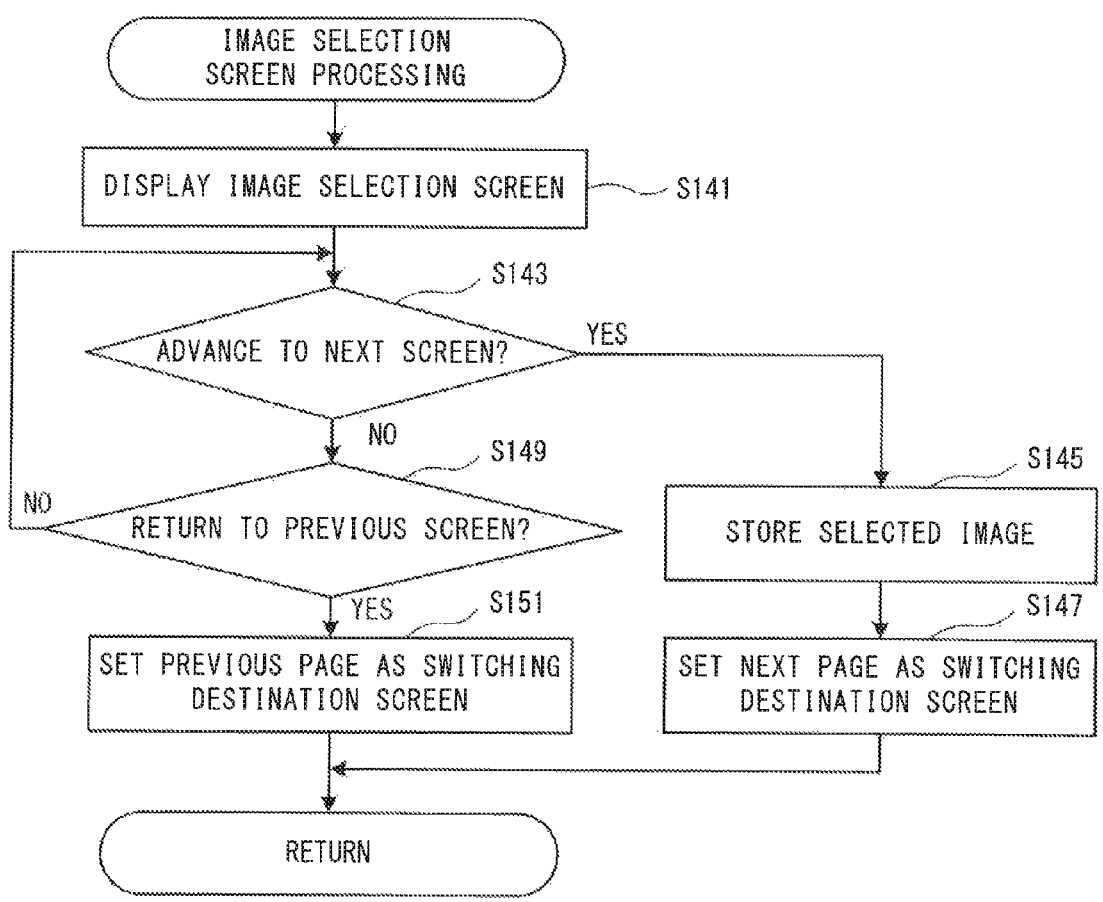
FIG. 11 is a flowchart of image selection screen processing.

As shown in FIG. 11, in the image selection screen processing, the display screen of the touch panel 30 is switched to the image selection screen G5 and the image selection screen G5 is displayed (step S141). The image selection screen G5 includes a plurality of decorative images that are displayed in a list format, and also includes an operation area that allows the user to freely select one of the decorative images (refer to FIG. 4). If the operation that instructs advancing to a next screen is performed on the image selection screen G5 (yes at step S143), the decorative image selected on the image selection screen G5 (a selected image) is stored in the RAM 23 (step S145).

After that, based on the screen group information stored in the HDD 24, the next page after the image selection screen G5 is set in the RAM 23 as the switching destination screen (step S147). However, if the display order of the image selection screen G5 indicated in the screen group information is the last page, the switching destination screen is updated to the not set status. On the other hand, if the operation that instructs returning to a previous screen is performed on the image selection screen G5 (no at step S143, yes at step S149), the previous page to the image selection screen G5 is set as the switching destination screen in the RAM 23 (step S151). However, if the display order of the image selection screen G5 indicated in the screen group information is the first page, the switching destination screen is updated to the image selection screen G5.

When an operation to switch the page has not been performed (no at step S143, no at step S149), the processing returns to step S143 and waits for the input operation by the user. After the processing at step S147 or at step S151 is performed, the processing returns to the print target setting processing (FIG. 6). Note that, in the next screen switching processing (FIG. 8), the display screen of the touch panel 30 is switched from the display of the image selection screen G5 to the display of the switching destination screen set at step S147 or at step S151. However, when the switching destination screen is updated to the not set status at step S147, the display screen of the touch panel 30 is switched to the final screen G7 (that will be described later) and the final screen G7 is displayed (no at step S11; step S15).

Figure 12:
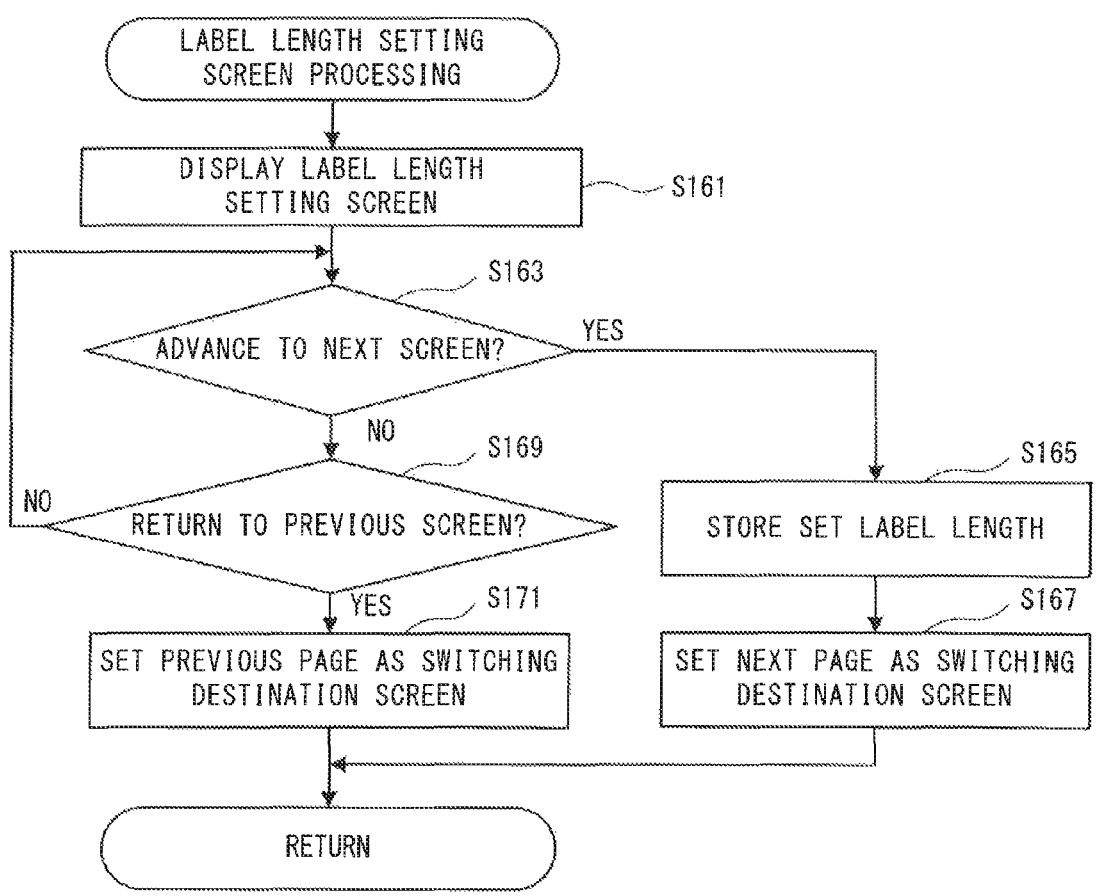
FIG. 12 is a flowchart of label length setting screen processing.

As shown in FIG. 12, in the label length setting screen processing, the display screen of the touch panel 30 is switched to the label length setting screen G6 and the label length setting screen G6 is displayed (step S161). The label length setting screen G6 includes an operation area that allows the user to freely set the length of a label (refer to FIG. 5). If the operation that instructs advancing to a next screen is performed on the label length setting screen G6 (yes at step S163), the label length set on the label length setting screen G6 (a set label length) is stored in the RAM 23 (step S165).

After that, based on the screen group information stored in the HDD 24, the next page after the label length setting screen G6 is set in the RAM 23 as the switching destination screen (step S167). However, if the display order of the label length setting screen G6 indicated in the screen group information is the last page, the switching destination screen is updated to the not set status. On the other hand, if the operation that instructs returning to a previous screen is performed on the label length setting screen G6 (no at step S163, yes at step S169), the previous page to the label length setting screen G6 is set as the switching destination screen in the RAM 23 (step S171). However, if the display order of the label length setting screen G6 indicated in the screen group information is the first page, the switching destination screen is updated to the label length setting screen G6.

When an operation to switch the page has not been performed (no at step S163, no at step S169), the processing returns to step S163 and waits for the input operation by the user. After the processing at step S167 or at step S171 is performed, the processing returns to the print target setting processing (FIG. 6). Note that, in the next screen switching processing (FIG. 8), the display screen of the touch panel 30 is switched from the display of the label length setting screen G6 to the display of the switching destination screen set at step S167 or at step S171. However, when the switching destination screen is updated to the not set status at step S167, the display screen of the touch panel 30 is switched to the final screen G7 (that will be described later) and the final screen G7 is displayed (no at step S11; step S15).

As shown in FIG. 13, in the preview screen processing, first, a print image is generated based on content that has been set on the setting screens displayed up to the current time (that is, based on the characters and decorative modes stored in the RAM 23) (step S181). The display screen of the touch panel 30 is switched to the preview screen that includes the print image generated at step S181 and the preview screen is displayed (step S183). In this manner, for example, the print image is generated and displayed (refer to FIG. 3 to FIG. 5) that is represented by the set characters and the set decorative modes in accordance with the preview screens PV1 to PV4 that are the display targets.

If the operation that instructs advancing to a next screen is performed on the currently displayed preview screen (yes at step S185), based on the screen group information stored in the HDD 24, the next page after the currently displayed preview screen is set as the switching destination screen in the RAM 23 (step S187). However, if the display order of the currently displayed preview screen indicated in the screen group information is the last page, the switching destination screen is updated to the not set status.

On the other hand, if the operation that instructs returning to a previous screen is performed on the currently displayed preview screen (no at step S185, yes at step S189), the previous page to the currently displayed preview screen is set as the switching destination screen in the RAM 23 (step S191). Note that, in the present embodiment, the display order of each of the preview screens indicated by the screen group information is not the first page.

When an operation to switch the page has not been performed (no at step S185, no at step S189), the processing returns to step S185 and waits for the input operation by the user. After the processing at step S187 or at step S191 is performed, the processing returns to the print target setting processing (FIG. 6). Note that, in the next screen switching processing (FIG. 8), the display screen of the touch panel 30 is switched from the display of the currently displayed preview screen to the display of the switching destination screen set at step S187 or at step S191. However, when the switching destination screen is updated to the not set status at step S187, the display screen of the touch panel 30 is switched to the final screen G7 (that will be described later) and the final screen G7 is displayed (no at step S11; step S15).

The explanation will return to FIG. 6. After the processing at step S13 is performed, the processing returns to step S9 and reading of the latest switching destination screen is performed. When the latest switching destination screen exists in the RAM 23 (yes at step S11), the above-described screen switching processing is performed (step S13) and the next page or the previous page that has been set as the switching destination screen is switched to and displayed. On the other hand, when there is no latest switching destination screen in the RAM 23 (no at step S11), the final screen G7 is displayed on the touch panel 30 (step S15). The final screen G7 includes a key image (a "Print" icon shown in FIG. 5) that is used to instruct printing of the print target data (namely, the characters and the decorative mode of the characters that are stored in the RAM 23) and a key image (a "Save File" icon shown in FIG. 5) that is used to instruct saving of the print target data.

When the "Print" icon is selected on the final screen G7, it is determined that the printing of the print target data is to be performed (yes at step S17) and a print command generated based on the print target data is transmitted to the printer 10 via the cable 2 (step S19). In the present embodiment, the print application has a known printer driver function and the above-described print command is generated by the print application. When the "Save File" icon is selected on the final screen G7, it is determined that the print target data is to be saved (no at step S17, yes at step S21) and the print target data is saved (newly registered or updated by being overwritten) in the HDD 24 (step S23).

On the other hand, if the operation that instructs returning to a previous screen is performed on the final screen G7 (no at step S21, yes at step S25), the previous page to the final screen G7 is set as the switching destination screen in the RAM 23 (step S27), and the processing returns to step S9. In this manner, in the next screen switching processing (FIG. 8), the display screen of the touch panel 30 is switched from the display of the final screen G7 to the display of the switching destination screen set at step S27. Note that, when an operation to switch the page has not been performed (no at step S25), the processing returns to step S17 and waits for the input operation by the user. After the processing at step S19 or step S23 is performed, the print target setting processing (FIG. 6) ends.

As a result of the above-described configuration and processing, in the mobile terminal 20 of the present embodiment, when it is determined that it is a screen switching timing, the plurality of screens that include the setting screens and the preview screens are sequentially switched and displayed on the touch panel 30 based on the screen group information. When the setting screen is displayed, the key images that are used for the input on the touch panel 30 are also displayed. When it is determined that it is the timing to switch the currently displayed setting screen, the preview screen is switched to and displayed on the touch panel 30. In other words, when the user inputs necessary information on the setting screen, the print image based on the input information can be verified on the preview screen that is displayed next.

Figure 3:
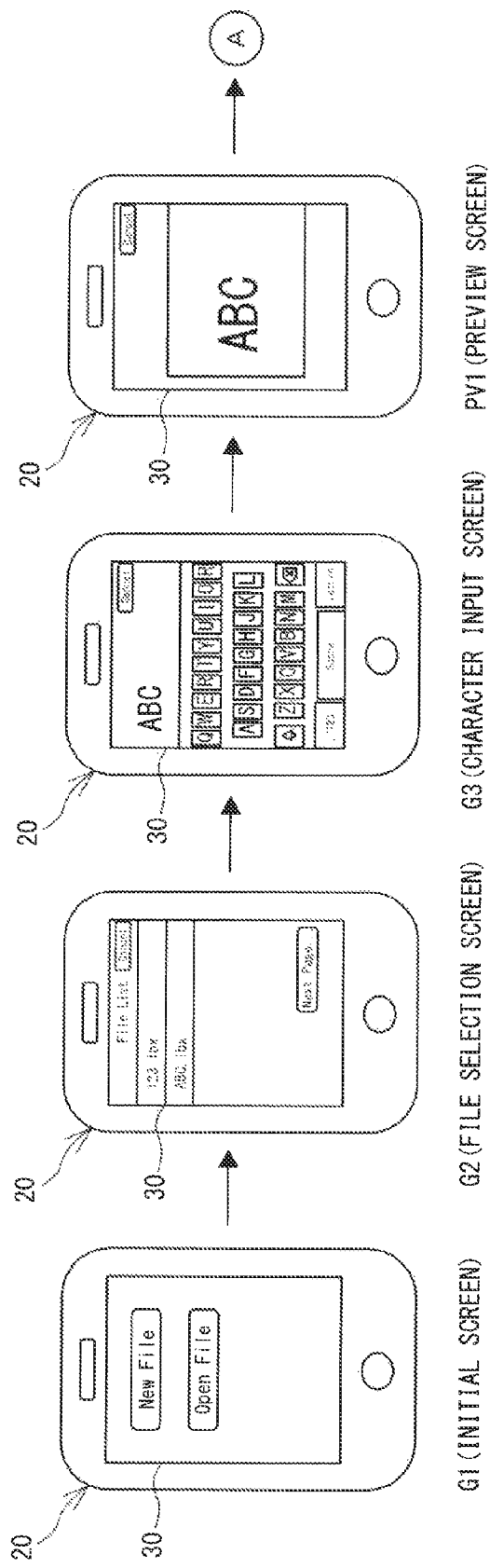
FIG. 3 is an example of a group of screens that are provided by a print application.
Figure 4:
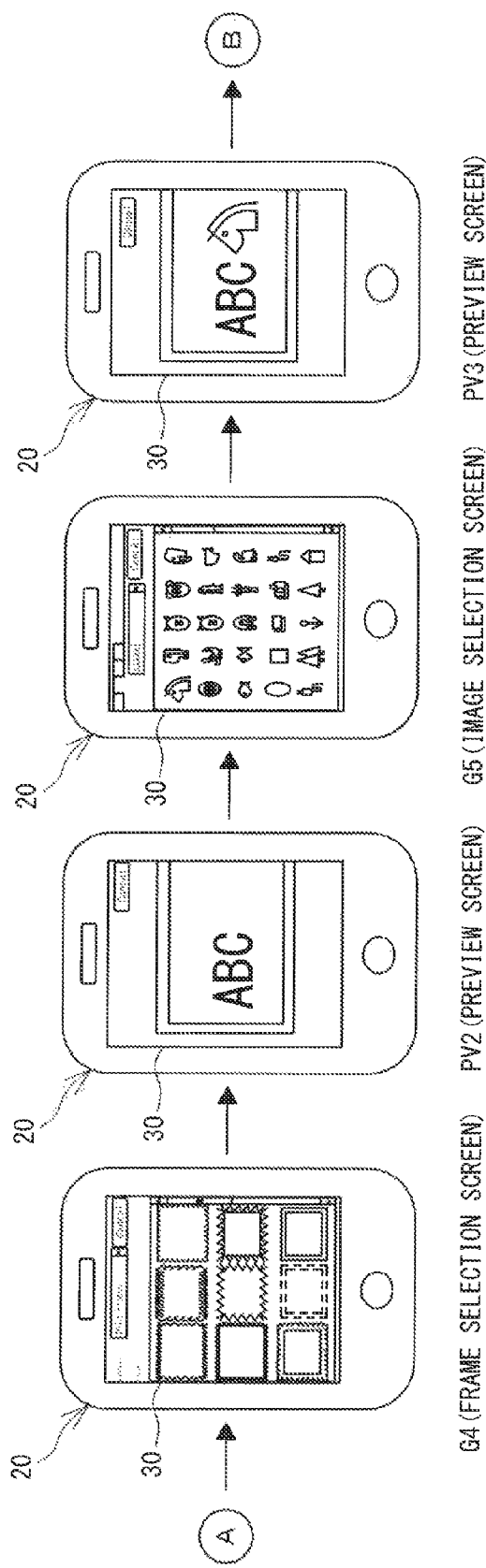
FIG. 4 is a continuation of the group of screens shown in FIG. 3.
Figure 5:
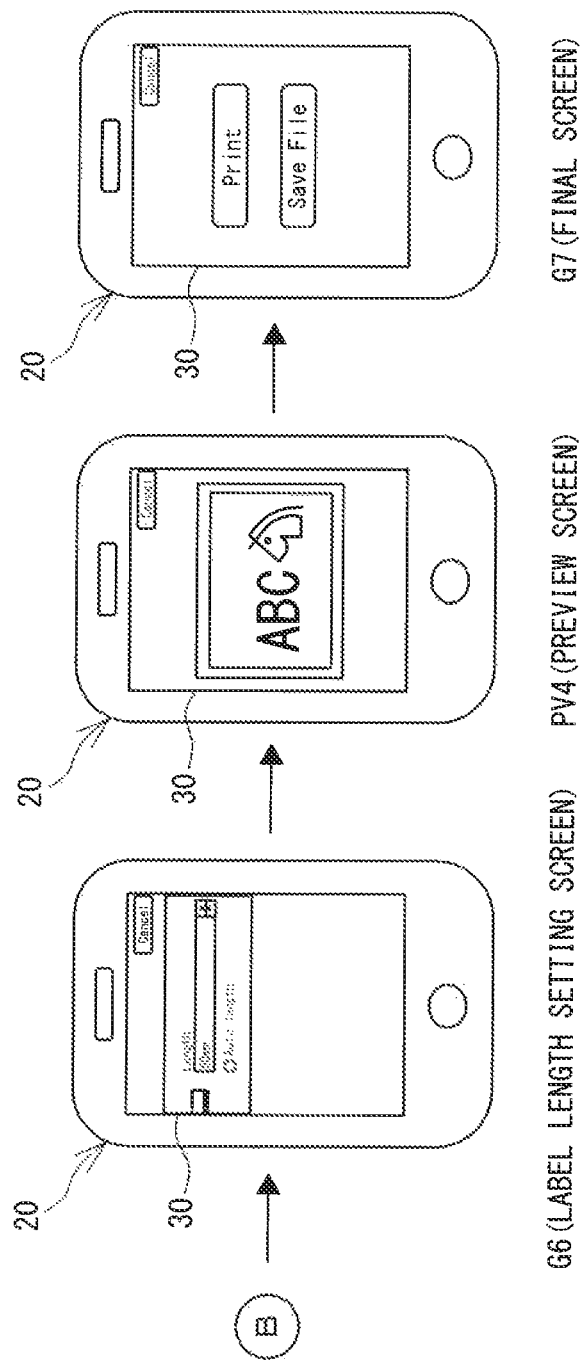
FIG. 5 is a continuation of the group of screens shown in FIG. 4.

For example, when the print application is activated in a state in which the default screen group information is stored in the HDD 24, the plurality of screens G1 to G7 are sequentially switched and displayed, as illustrated by FIG. 3 to FIG. 5. The user sequentially inputs various necessary pieces of information on each of the screens G1 to G7, and, by referring to the preview screens PV1 to PV4 that are displayed as appropriate in the course of inputting the information, the user can accurately and easily set the characters and the decorative mode of the characters of the print target.

The user can freely set the characters and the decorative mode of the characters (the decorative frame, the decorative image, the label length etc.) on the setting screens (the character input screen G3, the frame selection screen G4, the image selection screen G5, the label length setting screen G6 and so on). Furthermore, on these setting screens, the key images that are used by the user to set various pieces of information are also provided on the touch panel 30. As a result, even on a mobile terminal that does not have physical operation keys, the user can accurately and easily set the characters and the decorative mode of the characters of the print target.

On a compact computer terminal, such as the mobile terminal 20, an area of the touch panel 30 on which display can be performed is small. When the key images for the input of information are displayed on the touch panel 30, the areas to display various pieces of information on the touch panel 30 become even smaller. As a result, on a computer terminal (a smart phone, for example) on which known key images can be displayed, it is difficult to display the characters and the decorative mode of the characters set by the user, and the preview screen that is based on the setting content simultaneously in a size that can be recognized by the user.

Thus, on a known smart phone, for example, when characters and a decorative mode of the characters are interactively input sequentially on a plurality of screens, after a user inputs information on a setting screen, the screen switches to a preview screen and the user verifies whether the desired printing result is obtained. If there is no problem with the printing result that is displayed on the preview screen, it is necessary to return to the setting screen from the preview screen and, further, to switch to another setting screen and restart the information input.

In contrast to this, in the mobile terminal 20 of the present embodiment, the screen display is performed by a procedure that is established in advance by the screen group information, and the user can sequentially and interactively input the necessary information. Further, the preview screen is automatically displayed as appropriate after the setting screen. More specifically, based on the screen group information stored in the HDD 24, the plurality of setting screens are sequentially switched and displayed, and the preview screen is displayed at least once before all of the plurality of setting screens have been displayed.

Thus, when the user sets the characters and the decorative mode of the characters, if there is no problem on the preview screen that is displayed after one of the setting screens, it is not necessary for the user to return the screen. And thus it is not necessary to repeatedly perform a switching operation between the setting screen and the preview screen. Therefore, even on a small computer terminal, the user can accurately and easily set the characters and the decorative mode of the characters of the print target.

Note that, in the present embodiment, if the user specifies the display target screens and the display order of the display target screens, the CPU 21 changes the screen group information stored in the HDD 24 in accordance with the specified content. For example, it is assumed that the user specifies the display target screens and the display order of the display target screens such that the user does not set the decorative frame and the decorative image (in other words, the user sets only the label length) and sets the label length before setting the characters. In this case, the screen group information stored in the HDD 24 is changed to "G6→PV4→G3→PV1." In this manner, it is possible to enhance the freedom and efficiency when the user sets the characters and the decorative mode of the characters.

When the user specifies the setting screen that is the display target of the preview screen, the CPU 21 updates the screen group information stored in the HDD 24 such that the preview screen is displayed after the specified setting screen. For example, it is assumed that the user specifies the label length setting screen G6 only as the display target of the preview screen. In this case, the screen group information stored in the HDD 24 is updated to "G3→G4→G5→G6→PV4." In this way, it is possible to enhance the freedom and efficiency when the user sets the characters and the decorative mode of the characters.

The present disclosure is not limited to the above-described embodiment, and various modifications are possible. In the above-described embodiment, the display screen is switched in response to the user operation on the touch panel 30, but the display screen of the touch panel 30 may be switched when another condition is satisfied.

For example, at step S13 in the screen switching processing (refer to FIG. 8), after the display screen of the touch panel 30 has been switched, the display screen may be switched over when a predetermined time period (10 seconds, for example) has elapsed from a point in time at which a latest operation (that is, the last user operation on the display screen) is detected by the touch panel 30.

More specifically, at step S103, step S123, step S143, step S163 and step S185, it may be determined that advancing to the next screen will be performed when the predetermined time period has elapsed from the last user operation on the display screen of the touch panel 30. In this way, when the predetermined time period has elapsed from the last user operation on the display screen, it is considered that the information setting on the display screen is complete and the screen is thus advanced. In this manner, the setting of the characters and the decorative mode of the characters can be performed more quickly.

At step S13 in the screen switching processing (refer to FIG. 8), the screen may be switched over when a change in the rotation angle detected by the acceleration sensor 27 exceeds a predetermined angle (90 degrees, for example). More specifically, at step S103, step S123, step S143, step S163 and step S185, it may be determined that advancing to the next screen will be performed when a rotation angle of 90 degrees to the right is detected by the acceleration sensor 27.

In this way, as illustrated in FIG. 14, the user can advance to the next screen simply by rotating the mobile terminal 20 to the right after completing the information setting on the display screen, and thus the setting of the characters and the decorative mode of the characters can be performed even more quickly. In contrast, at step S109, step S129, step S149, step S169 and step S189, it may be determined that the screen be returned to the previous screen when a rotation angle of 90 degrees to the left is detected by the acceleration sensor 27. In this manner, the user can return the screen simply by rotating the mobile terminal 20 to the left.

In this modified example, it is preferable that the preview screen is displayed on the touch panel 30 such that the direction of the longer sides of the rectangular display area of the touch panel 30 matches the direction of the longer sides of the print image and the direction of the shorter sides of the rectangular display area of the touch panel 30 matches the direction of the shorter sides of the print image, as shown in FIG. 14. More specifically, when a rotation state is such that the touch panel 30 is vertically long, it is preferable that the vertically long setting screens (the character input screen G3 and the frame selection screen G4 in FIG. 14) are displayed. On the other hand, when the rotation state is such that the touch panel 30 is horizontally long, it is preferable that the horizontally long preview screens (the preview screens PV1 and PV2 in FIG. 14) are displayed. By displaying the optimum screen in accordance with the orientation of the touch panel 30 in this manner, it is possible to improve the operability of the mobile terminal 20 and improve the viewability of the display screen.

It should be noted that, in the printing system 1 exemplified by the above-described embodiment, the printer 10 and the mobile terminal 20 have a wired connection, via the cable 2. However the printer 10 and the mobile terminal 20 may be wirelessly connected. It goes without saying that the print target setting processing (FIG. 6) can be performed by the mobile terminal 20 alone even when the mobile terminal 20 is not connected to the printer 10 (this excludes step S19, however).

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image processing device comprising:
a touch panel configured to switch and display screens that include interactive screens and configured to detect an operation on at least one of the interactive screens currently being displayed, and each of the interactive screens being a screen on which a user interactively performs an input operation;
a screen group storage portion configured to store screen group information that defines the screens to be displayed sequentially on the touch panel and defines a display order of the screens, the screens that are defined by the screen group information including a plurality of setting screens and at least one preview screen, each of the plurality of setting screens being one of the interactive screens that prompts the user to set at least one of a character and a decorative mode, and each of the at least one preview screen being one of the interactive screens that shows a print image based on at least one of the character and the decorative mode set on the at least one of the plurality of setting screens;
a processor; and
a memory storing computer-readable instructions that, when executed by the processor, cause the image processing device to perform operations comprising:
determining that it is a switching timing when a predetermined condition is satisfied, the switching timing being a timing at which a currently displayed screen is switched to a next screen and the next screen is displayed, the currently displayed screen being one of the screens that is being displayed on the touch panel, and the next screen being one of the screens that is different to the currently displayed screen; and
switching the currently displayed screen to the next screen and displaying the next screen on the touch panel, based on the screen group information stored in the screen group storage portion, in response to determining that it is the switching timing;
wherein
when the currently displayed screen is switched to the next screen that is one of the plurality of setting screens and the next screen is displayed on the touch panel, a key image that is used to input information on the next screen is displayed along with the next screen, and
when the currently displayed screen that is one of the plurality of setting screens is switched to the next screen and the next screen is displayed on the touch panel, one of the at least one preview screen is displayed on the touch panel as the next screen at least once until all of the plurality of setting screens are sequentially switched and displayed on the touch panel; and
the image processing device further comprising:
an angle detection portion configured to detect a rotation angle of the image processing device from a normal state;
wherein
it is determined to be the switching timing when a change in the rotation angle detected by the angle detection portion exceeds a predetermined angle, and one of the plurality of setting screens or one of the at least one preview screen is displayed as the next screen depending on the current rotation angle detected by the angle detection portion.

2. The image processing device according to claim 1, wherein the computer-readable instructions, when executed by the processor, further cause the image processing device to perform operations comprising:
updating the screen group information stored in the screen group storage portion in accordance with the screens and the display order specified by the user.

3. The image processing device according to claim 1, wherein
when the currently displayed screen is a specified setting screen, a specified preview screen displayed as the next screen on the touch panel, the specified setting screen being one of the setting screens that is specified as a display target of a specified preview screen, the specified preview screen being one of the at least one preview screen, and
the computer-readable instructions, when executed by the processor, further cause the image processing device to perform operations comprising:
updating the screen group information stored in the screen group storage portion such that the specified preview screen is displayed after the specified setting screen, when the user has specified the specified setting screen.

4. The image processing device according to claim 1, wherein
after the currently displayed screen is switched to the next screen and the next screen is displayed on the touch panel, it is determined to be the switching timing when an elapsed time period from a time point at which a latest operation is detected by the touch panel exceeds a predetermined time period.

5. The image processing device according to claim 1, wherein
the touch panel has a rectangular display area,
each of the at least one preview screen shows the print image in which at least one of the character and the decorative mode is printed on a long medium, and
when one of the at least one preview screen is displayed on the touch panel as the next screen, the preview screen is displayed on the touch panel in a format in which a direction of longer sides of the rectangular display area matches a direction of longer sides of the print image and a direction of shorter sides of the rectangular display area matches a direction of shorter sides of the print image.

6. The image processing device according to claim 1, wherein
the image processing device is a mobile terminal configured to be connected to a printer, and
the computer-readable instructions, when executed by the processor, further cause the image processing device to perform operations comprising:
displaying a print instruction screen on the touch panel, the print instruction screen being one of the interactive screens that prompts the user to instruct execution of printing; and
transmitting a command to print the print image to the printer when the execution of printing is instructed from the print instruction screen.

7. A non-transitory computer-readable medium storing an image processing program, the image processing program comprising computer-readable instructions to be executed by a processor of an image processing device, the image processing device comprising a touch panel and a screen group storage portion, to cause the processor to perform the steps of:
determining that it is a switching timing when a predetermined condition is satisfied, the switching timing being a timing at which a currently displayed screen is switched to a next screen and the next screen is displayed, the currently displayed screen being one of screens that is being displayed on the touch panel, the next screen being one of the screens that is different to the currently displayed screen, the screens including interactive screens, the touch panel being configured to switch and display the screens and to detect an operation on at least one of the interactive screens currently being displayed, and each of the interactive screens being a screen on which a user interactively performs an input operation; and
switching and displaying the screens on the touch panel, based on screen group information stored in the screen group storage portion, in response to determining that it is the switching timing, the screen group storage portion being configured to store screen group information, the screen group information defining the screens to be displayed sequentially on the touch panel and a display order of the screens, the screens that are defined by the screen group information including a plurality of setting screens and at least one preview screen, each of the plurality of setting screens being one of the interactive screens that prompts the user to set at least one of a character and a decorative mode, and each of the at least one preview screen being one of the interactive screens that shows a print image based on at least one of the character and the decorative mode set on the at least one of the plurality of setting screens;
wherein
when the currently displayed screen is switched to the next screen that is one of the plurality of setting screens and the next screen is displayed on the touch panel, a key image that is used to input information on the next screen is displayed along with the next screen,
when the currently displayed screen that is one of the plurality of setting screens is switched to the next screen and the next screen is displayed on the touch panel, one of the at least one preview screen is displayed on the touch panel as the next screen at least once until all of the plurality of setting screens are sequentially switched and displayed on the touch panel; and
wherein it is determined to be the switching timing when a change in a rotation angle detected by an angle detection portion exceeds a predetermined angle, the angle detection portion being configured to detect the rotation angle of the image processing device from a normal state, and
one of the plurality of setting screens or one of the at least one preview screen is displayed as the next screen depending on the current rotation angle detected by the angle detection portion.

8. The non-transitory computer-readable medium according to claim 7 wherein the image processing program further includes computer-readable instructions to cause the processor to perform the step of
updating the screen group information stored in the screen group storage portion in accordance with the screens and the display order specified by the user.

9. The non-transitory computer-readable medium according to claim 7 wherein
when the currently displayed screen is a specified setting screen, a specified preview screen displayed as the next screen on the touch panel, the specified setting screen being one of the setting screens that is specified as a display target of a specified preview screen, the specified preview screen being one of the at least one preview screen, and the image processing program further includes computer-readable instructions to cause the processor to perform the step of updating the screen group information stored in the screen group storage portion such that the specified preview screen is displayed after the specified setting screen, when the user has specified the specified setting screen.

10. The non-transitory computer-readable medium according to claim 7 wherein after the currently displayed screen is switched to the next screen and the next screen is displayed on the touch panel, it is determined to be the switching timing when an elapsed time period from a time point at which a latest operation is detected by the touch panel exceeds a predetermined time period.

11. The non-transitory computer-readable medium according to claim 7, wherein the touch panel has a rectangular display area, each of the at least one preview screen shows the print image in which at least one of the character and the decorative mode is printed on a long medium, and when one of the at least one preview screen is displayed on the touch panel as the next screen, the preview screen is displayed on the touch panel in a format in which a direction of longer sides of the rectangular display area matches a direction of longer sides of the print image and a direction of shorter sides of the rectangular display area matches a direction of shorter sides of the print image.

12. The non-transitory computer-readable medium according to claim 7, wherein the image processing device is a mobile terminal configured to be connected to a printer, and the image processing program further includes computer-readable instructions to cause the processor to perform the steps of:

displaying a print instruction screen on the touch panel, the print instruction screen being one of the interactive screens that prompts the user to instruct execution of printing; and transmitting a command to print the print image to the printer when the execution of printing is instructed from the print instruction screen.

* * * * *